INVENTOR.
JOHN B. LEECE
BY Hudson, Boughton,
Williams, David & Hoffmann
ATTORNEYS July 21, 1953

J. B. LEECE 2,645,796

APPARATUS FOR REMOVING INSULATION FROM THE
TERMINAL LEADS OF ELECTRICAL MEMBERS

Filed June 24, 1948

INVENTOR.
JOHN B. LEECE
BY Hudson, Boughton,
Williams, David & Hoffmann.
ATTORNEYS Patented July 21, 1953

2,645,796

UNITED STATES PATENT OFFICE 2,645,796

APPARATUS FOR REMOVING INSULATION FROM THE TERMINAL LEADS OF ELECTRICAL MEMBERS

John B. Leece, University Heights, Ohio, assignor to The Leece-Neville Company, Cleveland, Ohio, a corporation of Ohio Application June 24, 1948, Serial No. 34,923

10 Claims. (Cl. 15—21)

This invention relates to apparatus for removing insulation material from electric terminal elements such as lead wires to prepare them for a soldering operation or the like and, more particularly, relates to improved apparatus of this kind.

In the manufacture of electrical equipment it is frequently necessary to remove the insulating material from lead wires which require soldering operations to be performed thereon. For example, in the manufacture of certain small electric motors, each armature has eleven wire leads extending from the armature coils and which leads are required to be soldered to a corresponding number of commutator segments. These leads ordinarily have an insulating coating of a varnish-like material thereon which must be removed before the soldering can be properly carried out.

The removal of the insulating coating from such a large number of leads would require considerable time and would be very tedious work if it were to be carried out manually on the leads individually. The present invention provides a machine for performing this work and which greatly expedites the work and reduces the labor costs involved in preparing such leads for soldering. As explained in detail hereinafter, the machine removes the insulation material from all of the leads of an armature as a group at substantially one time and from the leads of a number of such armatures in rapid succession.

As its principal object, this invention accordingly provides an improved machine capable of removing insulation material from an entire group of terminal elements or leads at substantially the same time and which is also adapted to operate in rapid succession on armatures or other members carrying groups of such terminal elements or leads.

Another object of this invention is to provide an improved insulation removing machine which will be capable of operating rapidly and substantially continuously on such groups of leads and with which it is only necessary for an operator to insert the members carrying the groups of leads into the workholders of the machine and to subsequently remove the members from the workholders after they have been operated upon.

A further object of the invention is to provide an improved insulation removing machine having heat-treating and cleaning stations to which the groups of leads are advanced in succession, preferably by an intermittently movable feed table.

Still another object is to provide an improved machine of this character having novel heating means for heat-treating groups of leads for burning and/or loosening the insulation material thereon.

Yet another object is to provide an improved machine of the character mentioned having novel brushing means for cleaning the groups of leads after they have been heat-treated.

As another of its objects, this invention provides a novel machine of the character mentioned in which a rotary feed table has gear-driven rotary workholders thereon for carrying the groups of leads and in which the table is propelled by the drag of the gear means for the workholders so that when the advance movement of the table is stopped to locate the workholders at the respective stations, the gear means will continue to rotate the workholders.

Still another object is to provide an improved machine of this kind in which novel means is employed for controlling the movement of the feed table.

The invention can be further briefly summarized as consisting in certain novel combinations and arrangements of parts hereinafter described and particularly set out in the claims hereof.

In the accompanying sheets of drawings,

Fig. 4 is another partial vertical section taken through the mounting means for the rotary feed table, the view being taken substantially as indicated by section line 4—4 of Fig. 1;

Figure 1:
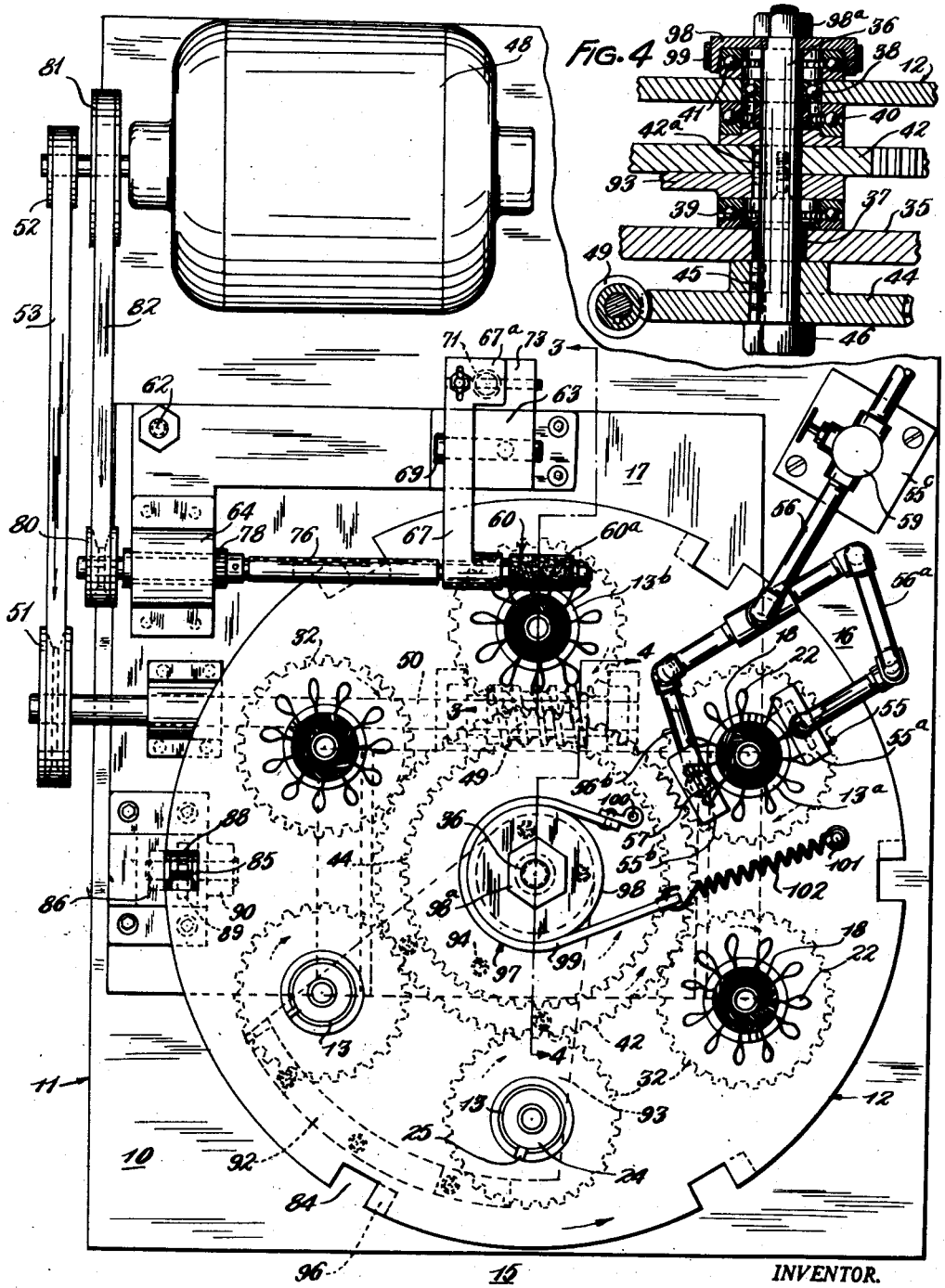
Fig. 1 is a plan view of an insulation removing machine embodying the present invention.
Figure 2:
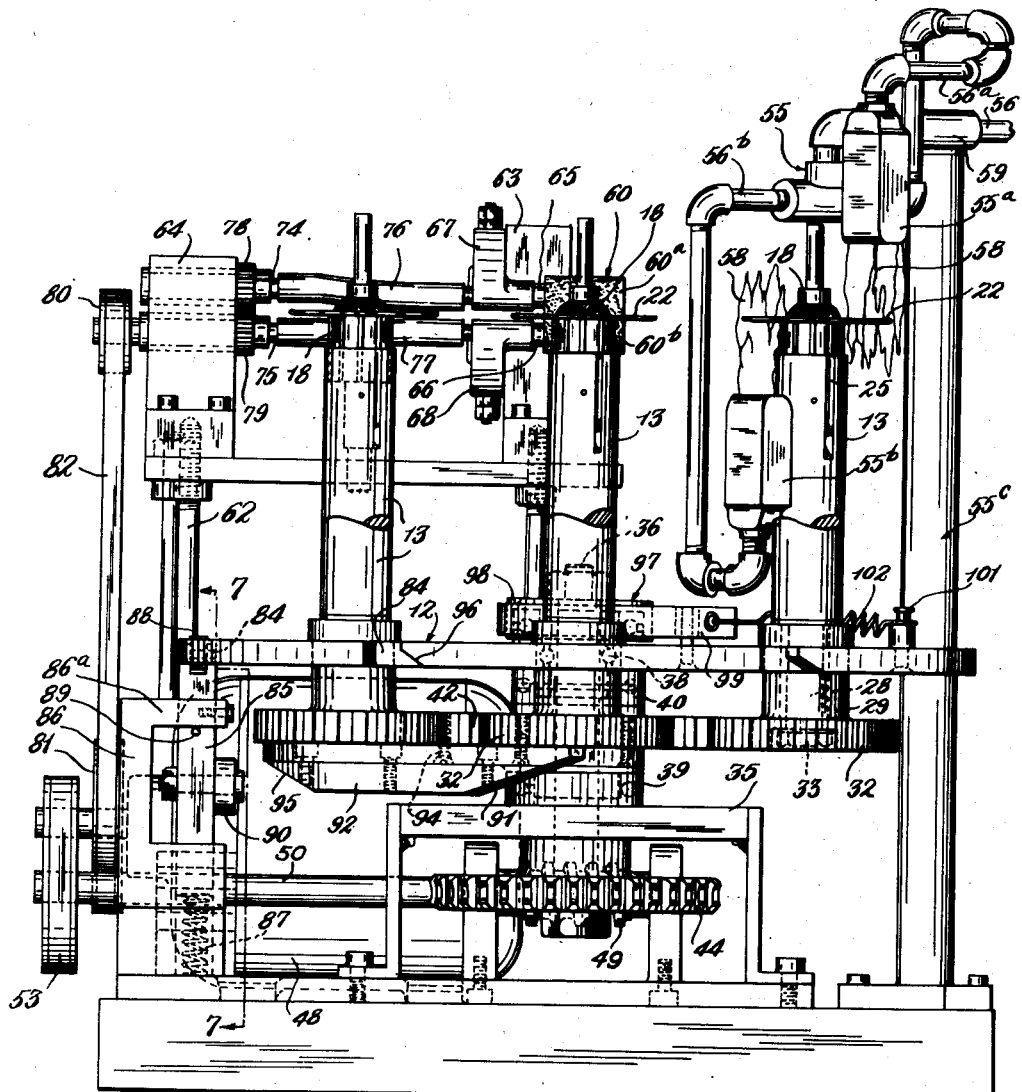
Fig. 2 is a front elevation of the machine.
Figure 7:
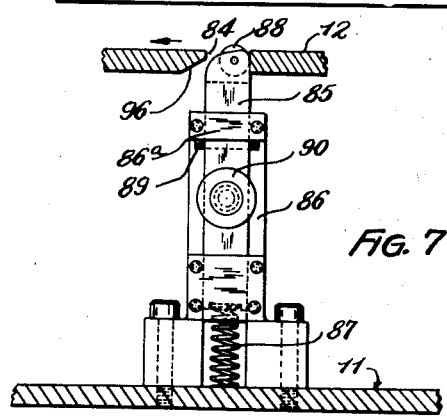
Fig. 7 is a partial vertical section taken as indicated by line 7—7 of Fig. 2 and showing the latch means for interrupting the rotary movement of the feed table.

The machine 10, which is illustrated in the drawings as representing one embodiment of this invention, is provided with a base 11 on which the machine is adapted to stand and a rotary feed table 12 located in spaced relation above the base. The feed table 12 is here shown as comprising a substantially flat circular plate having a group of workholders 13 rotatably mounted thereon. The workholders are disposed in upright relation so as to extend above the table and are arranged in circumferentially spaced relation thereon. In this instance the table carries six of these workholders, although any other desired number could be provided.

A plurality of work stations are located at spaced points around the table 12 and include a loading and unloading station 15 at the front of the table, a heat-treating station 16 and a cleaning station 17. As viewed in Fig. 1, the feed table 12 rotates in a counter-clockwise direction and moves the workholders 13 so that they travel from the loading and unloading station 15 to the heat-treating and cleaning stations 16 and 17 in succession and then back to the loading and unloading station.

Before proceeding further with the detailed description of the machine 10, it is appropriate to briefly describe one of the articles on which the machine operates and which, as mentioned above, is an armature for a small electric motor. The drawings show such a motor armature 18 as having a substantially cylindrical laminated metal body 19 provided with axial slots 19a. A shaft 20 extends through the armature body and has end portions 20a and 20b projecting beyond opposite ends of such body. Wound wire inductor coils 21 are located in the slots 19a and include leads or terminal elements 22 in the form of wire loops. These leads are later connected by a soldering operation to the segments of a commutator (not shown) which is subsequently mounted on the shaft portion 20b.

For purposes of the insulation removing operation to be carried out on the leads 22 by the machine 10, these leads are temporarily disposed in an annular series around the shaft 20, as shown in Fig. 1, and extend laterally radially outwardly therefrom so that all of the leads of the group lie in substantially the same plane, that is to say, in a plane extending substantially normal to the axis of the shaft 20. The motor armature 18 as here shown carries eleven of the leads 22 although it should be understood that the machine 10 is capable of operating on parts or members carrying a different number of leads disposed in various other arrangements and is capable of operating on various lead-carrying articles other than motor armatures. As mentioned above, the leads 22 have a varnish-like coating of insulation material thereon and the purpose of the machine 10 is to efficiently remove this insulation material from the extreme end portions of the leads without damaging the insulation coating on the inductor coils 21.

Figures 3, 5, 6:
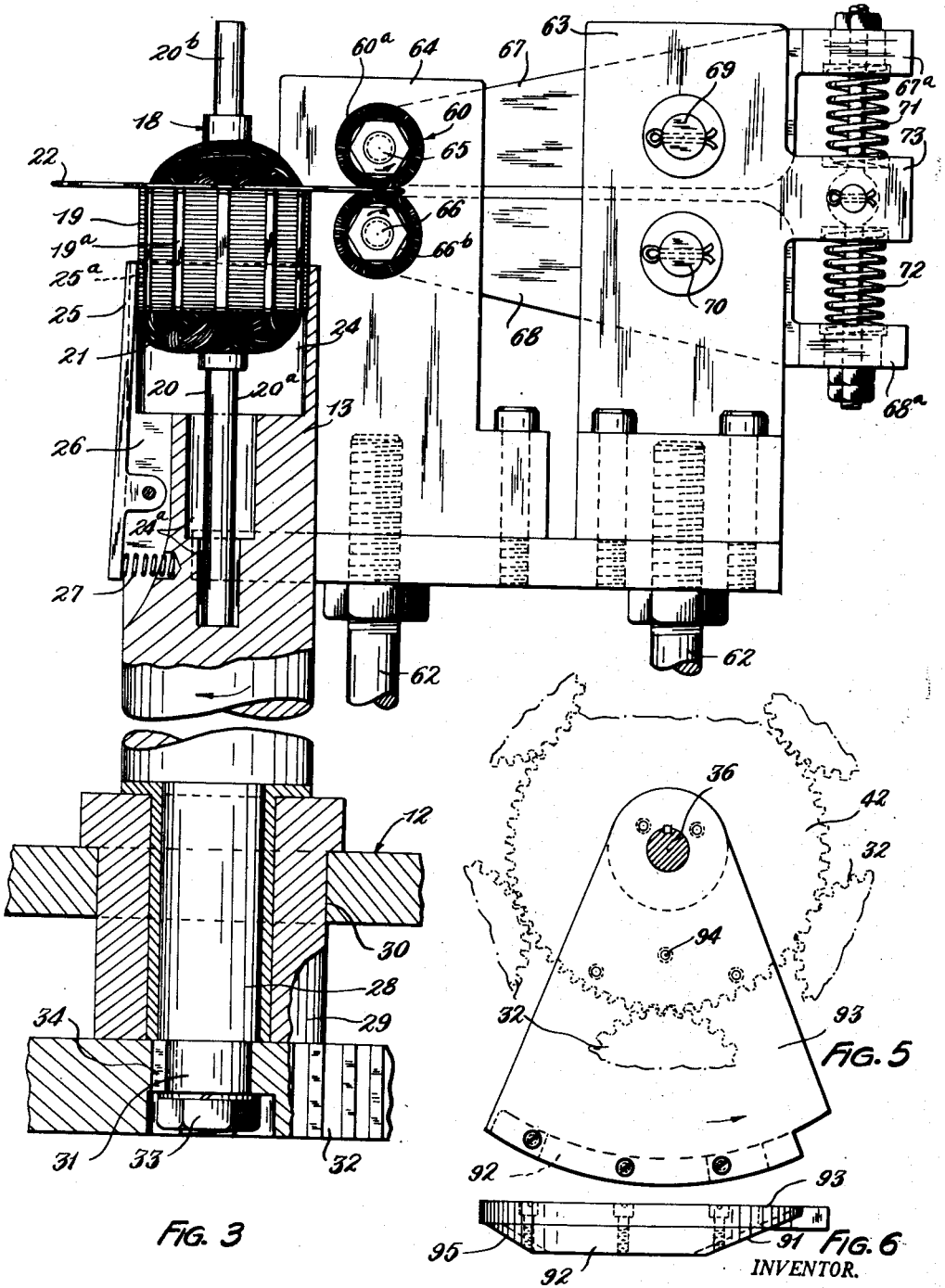
Fig. 3 is a partial vertical section taken through the workholder which is temporarily located at the cleaning station, the view being taken as indicated by section line 3—3 of Fig. 1.
Fig. 5 is a fragmentary horizontal section showing the table control cam and the gearing for driving the workholders.
Fig. 6 is an edge view of the table control cam.

The workholders 13 can be in the form of upright spindles each having a work receiving recess 24 in its upper end of a size and shape to freely receive one end of the body 19 of an armature 18. The recess 24 includes a depending axial extension 24a adapted to accommodate the shaft portion 20a of the armature. The armatures 18 are held in axially upright relation by the workholders 13 such that the plane in which the leads 22 lie extends in substantially parallel relation to the feed table 12. Each armature is suitably held from rotating in its recess 24 as by means of a finger 25 pivotally mounted on the workholder in a vertical slot 26 thereof and having a lug 25a adapted to engage in one of the slots 19a of the armature body 19, as shown in Fig. 3. A compression spring 27 acts on the finger 25 to swing the same in a direction to engage the lug 25a in one of the slots 19a. The lug 25a is preferably of a rounded shape so that the armature 18 can be readily inserted into and removed from the recess 24 of the workholder.

Each of the workholders 13 is provided at its lower end with a shaft portion 28 which is rotatably mounted in a shouldered bearing sleeve 29 which is carried by the work table 12 and which sleeve extends through an opening 30 of the table. The shaft portions 28 and the sleeves 29 provide mounting means by which the workholders 13 are rotatably mounted on the table 12. The lower end of each shaft portion 28 is provided with a reduced portion 31 projecting beyond the sleeve 29 and on which is mounted a pinion or planetary gear member 32 for driving the workholder 13, as explained hereinafter. The pinion 32 is drivingly connected with the shaft portion 31 as by means of the nut 33 and the key 34.

For rotatably supporting the feed table 12, the base 11 of the machine 10 is provided with a bracket 35 which is suitably mounted on the upper side thereof and supports an upright shaft 36 which extends through the bracket and is journalled in bushing 37 thereof. The feed table 12 is journalled for rotation about the shaft 36 by means of the anti-friction bearing member 38 and is supported on the bracket 35 by means of a group of vertically spaced anti-friction thrust bearings 39, 40 and 41. At a point between the feed table 12 and the bracket 35, the shaft 36 has a main gear 42 connected thereto by the key 42a as shown in Fig. 4, and at a point below the bracket 35 this shaft has a worm gear 44 connected thereto by means of the key 45 and the nut 46.

A suitable power device, such as the electric motor 48 mounted on the base 11, provides the motive force for driving the machine 10. The upright shaft 36 is driven continuously during the operation of the machine by the cooperation of a worm element 49 with the worm gear 44. The worm element 49 is mounted on a shaft 50 which is operably connected with the electric motor 48 by means of the pulleys 51, 52 and the belt 53 extending therearound. The pinions 32 of the workholders 13 are in meshing engagement with the main gear 42 at spaced points therearound in the manner of planetary gears and the driving of the main gear by the shaft 36 causes continuous rotation to be imparted to the workholders.

In accordance with the present invention, the feed table 12 is preferably not driven in a positive manner, but is capable of free floating rotation about the shaft 36. Since the feed table carries the workholders 13 which are positively driven from the shaft 36 by the main gear 42 and the meshing of the pinion gears 32 with the latter, the table will be driven by the drag of the pinion gears on the main gear. The driving of the feed table 12 in this manner is an important feature because the table can be stopped intermittently as the workholders arrive at the different stations and when the table is stopped at such work stations for a desired interval of time the workholders will be driven continuously during such time interval for the performance of the work on the leads 22 as explained hereinafter.

At the heat-treating station 16 the machine 10 is provided with a heating means 55 for carrying out a heat-treating operation on the leads 22 for burning and/or loosening the insulation coating thereof. In accordance with another important feature of the present invention the heating means 55 comprises a pair of gas burners 55a and 55b to which a suitable gas and air mixture is adapted to be supplied by the supply pipe 56 and the branch pipes 56a and 56b. The burners 55a and 55b can be supported by a post 55c and are located so as to lie on substantially diametrically opposite sides of the workholder 13a when the latter occupies the work station 16. Each of the burners 55a and 55b has a slot 57 from which a stream of gas and air mixture issues and burns as a sustained flame 58.

The burners 55a and 55b are located so that one of these burners, for example the burner 55a, directs its flame downwardly onto the outer ends of the leads 22 at one point of the annular group and the burner 55b directs its flame upwardly against the outer ends of the leads at a substantially diametrically opposite point of the group. While the flames 58 are playing against the leads 22 the armature 18 carried by the workholder 13a will be rotated continuously so that the entire group of leads will traverse the flames and a heating or heat treatment will be obtained by which the insulation coating on all of the leads will be burned therefrom or sufficiently loosened to permit its complete removal at the cleaning station 17. The supply of gas to the burners 55a and 55b can be discontinued by closing the shut-off valve 59 when the machine 10 is not in operation.

After the heat-treating operation above described has been carried out on the leads of an armature held by the workholder 13a, the table 12 advances this workholder to the cleaning station 17 and which position is shown in the drawings as being temporarily occupied by the workholder 13b. At the work station 17 the machine 10 is provided with a brushing means 60 comprising a pair of opposed cooperating substantially cylindrical rotary brushes 60a and 60b having a brushing zone therebetween. These brushes are disposed in substantially horizontal relation, that is to say with their rotation axes substantially parallel to the plane of the feed table 12. The brushes are located at an elevation above the table such that when an armature 18 is advanced to the cleaning station 17, one point of the annular group of leads 22 will be received in the brushing zone between the adjacent faces of the two brushes as shown in the drawings.

The brushing means 60 can be supported above the base 11 by spaced posts or columns 62 extending thereabove and includes bearing brackets 63 and 64 carried by such posts. The brushes 60a and 60b are carried by rotary spindles 65 and 66 which extend through and are journalled in a pair of arms 67 and 68. The arms 67 and 68 are pivoted on the bearing bracket 63 by means of the pivot pins 69 and 70. These arms are rockable on the pivot pins 69 and 70 for causing the brushes 60a and 60b to have a closing and opening movement relative to the group of leads 22 received therebetween. On the side of the pivot pins 69 and 70 which is remote from the brushes 60a and 60b the arms 67 and 68 are provided with extensions 67a and 68a which are acted upon by the compression springs 71 and 72. These springs have their adjacent ends in seating engagement with a lug 73 of the bearing bracket 63 and normally act on the arms 67 and 68 to swing the latter in a direction to cause closing of the brushes 60a and 60b against the group of leads 22.

The brushes 60a and 60b are driven continuously during the operation of the machine 10 by means of a pair of shafts 74 and 75 which are connected with the brush spindles 65 and 66 by the flexible shaft members 76 and 77. The driving shafts 74 and 75 are suitably journalled in the bearing bracket 64 and are interconnected with each other by the meshing gears 78 and 79 mounted on these shafts. One of the shafts, for example the lower shaft 75, is connected with the electric motor 48 to be driven therefrom as by means of the pulleys 80, 81 and the belt 82 extending therearound.

When one of the armatures 18 is advanced to the cleaning station 17 and the workholder 13b carrying the armature is temporarily maintained at this station by stopping the rotation of the table 12 the annular group of leads 22 will be received between the brushes 60a and 60b and will be subjected to a cleaning action by the latter during which the previously loosened insulation coating, or any residue resulting from the burning thereof, will be removed from the leads. While the workholder 13b remains at the cleaning station 17 the workholder will be rotated continuously causing the entire group of leads 22 to traverse the brushing zone provided between the cooperating brushes. When the brushing operation has been accomplished, the table 12 advances the workholder 13b to the loading and unloading station 15 at which point the cleaned armature will be removed from the workholder and another armature substituted in its place to be carried to the heating and cleaning stations.

The control of the rotary movement of the feed table 12 also constitutes an important feature of the present invention and will be described next. For purposes of this control the table 12 is provided with notches 84 formed in its outer edge and spaced circumferentially therearound. A latch member 85 cooperates with these notches for temporarily stopping the rotary movement of the table. The latch member 85 is mounted for vertical sliding movement in a suitable bracket 86 which is located beneath the table and mounted on the base 11. The upper end of the latch member 85 is engageable in one of the notches 84 for temporarily stopping the table while the workholders 13a and 13b are located at the heat-treating and cleaning stations 16 and 17, as shown in Fig. 1. After the heat-treating and cleaning functions have been accomplished the latch member is retracted from the notch 84, thereby releasing the table so that it can advance the workholders from station to station as explained above.

The latch member 85 is normally urged upwardly towards the engaged position by means of the compression spring 87 and is provided at its upper end with a roller 88 which engages the underside of the table 12 and over which the table can travel smoothly while the table is being advanced an angular distance corresponding with the spacing of the work stations 16 and 17. The upward movement of the latch member into one of the notches 84 is limited by a suitable stop which, in this instance, is a pin 89 extending transversely through the latch member and engageable with the upper portion 86a of the bracket 86.

For retracting the latch member 85 from the notch 84, the latch member is provided with a roller 90 suitably mounted thereon and adapted to be engaged by the sloping face 91 of a cam 92. The cam 92 is carried by a cam plate or sector 93 which is mounted in fixed relation on the main gear 42 as by means of the screws 94. During rotation of the main gear 42 by the shaft 36, the cam 92 will also be rotated around the axis of this shaft and during each revolution of the cam its sloping face 91 will engage the roller 90 and retract the latch member 85 from the notch 84 in which it is then engaged. As the cam 92 moves away from the roller 90 its sloping face 95 will release the latch member and permit the latter to be shifted upwardly by the spring 87 thus engaging the roller 88 against the underside of the table 12, as explained above. Upon the withdrawal of the latch member 85 from the notch 84 the table 12 advances the workholders 13, as explained above, and the latch member engages in the next succeeding notch.

To facilitate the movement of the latch member 85 into the notches of the feed table 12 smoothly and without jarring, the table is preferably provided with sloping faces 96 formed by cutting away portions of the table immediately adjacent the notches. As the table moves over the bracket 86 the roller 88 of the latch member 85 will travel upwardly along the inclined surface 96 to thereby permit the latch member to move smoothly into the adjacent notch 84. When the latch member 85 has thus become engaged in one of the notches 84 it holds the table 12 against rotation until the latch member is retracted from the notch by the succeeding revolution of the cam 92.

Since the feed table 12 has a free floating rotary movement, as explained above, the advance movement thereof can be further controlled by means of a braking device 97. This braking device is here shown as comprising a brake drum 98 located on the upper side of the table 12 in substantially coaxial relation to the shaft 36 and connected to the latter by the nut 98a. In this instance the brake drum 98 also forms a housing or cap for the upper thrust bearing 41. The brake device 97 also includes a brake band 99 frictionally engaging the peripheral surface of the brake drum 98 and extending therearound. One end of the brake band 99 is anchored on the table 12 at one point thereof by means of the anchor pin 100 and the other end of the brake band is connected with another anchor pin 101 by means of the tension spring 102.

In the arrangement just described for the braking device 97 the brake drum 98 rotates with the shaft 36 and the brake band 99 rotates with the table 12. Since the main gear 42 is of a relatively large diameter its action on the workholder gears 32 will tend to rotate the table at a higher speed than is desired and the braking device serves to retard the rotary movement of the table to an extent sufficient to obtain the desired rate of advance movement for the workholders. The retarding of the rotary movement of the table by the brake device also prevents objectionable shock when the table is stopped by the latch member 85. The control thus provided for the table movement by the brake device 97 can be varied by removing the spring 102 and substituting therefor another spring having a different tension value.

The operation of the machine 10 has already been described above, but to summarize such operation it is explained that the armatures 18 are inserted into the workholders 13 in succession at the loading and unloading station 15. The counter-clockwise movement of the feed table 12 causes the armatures to be carried along a substantially circular orbit to the heat-treating station 16 in succession and also from the heat-treating station to the cleaning station 17 in succession. The workholders are driven continuously by the main gear 42 and when an armature arrives at the heat-treating station 16, the rotary movement of the table 12 is stopped by the latch 85 until the heat-treating operation has been accomplished. The table is then released by the withdrawal of the latch member 85 from a notch 84 and the table advances the heat-treated armature to the cleaning station 17. When the armature arrives at the cleaning station 17 the rotary movement of the table 12 is again stopped until the cleaning operation has been accomplished by the brushes 60a and 60b. When the cleaning operation has been completed the table 12 is released and thereupon advances the cleaned armature to the loading and unloading station at which point it is removed from the workholder.

From the foregoing description and the accompanying drawings it will now be readily understood that this invention provides an improved machine for removing insulation material from the leads or terminal elements of armatures or other articles on which such an operation is necessary to prepare the leads for soldering or the like. It will now also be understood that in the improved machine heat-treating and cleaning stations are provided to which the armatures are moved in succession by intermittent rotary movement of the feed table. It will also be seen that the machine embodies novel heat-treating and brushing devices for effectively accomplishing the removal of the insulation material. Additionally, it will be seen that the free floating rotary movement of the table, in combination with the continuous rotation of the workholders, provides a simple and convenient way for accomplishing the desired sequential movement of the workholders to the respective stations. It will be recognized furthermore that the invention provides novel control means by which such rotary movement of the feed table can be controlled and a desired speed of operation obtained for the machine.

Although the improved insulation removing machine provided by this invention has been illustrated and described herein to a detailed extent, it will be understood, of course, that the invention is not to be regarded as being limited correspondingly in scope but includes all changes and modifications coming within the spirit of the invention and the terms of the claims hereof.

Having thus described my invention, I claim:

1. In an insulation removing machine for operation on electrical articles of the kind having a group of insulation-covered terminal elements projecting therefrom and lying substantially in the same plane, a table, means supporting said table for rotary movement, a plurality of workholders adapted to receive individual articles and to support said articles with the groups of terminal elements of all of the articles lying substantially in a common plane, a cleaning station adjacent said table, means mounting said workholders for rotation on said table and for advance movement by the table to said cleaning station in succession, a pair of cooperating insulation removing rotary brushes at said cleaning station and disposed in a relation to define a work zone therebetween and for operating against said terminal elements from opposite sides of said common plane, means operable to impart rotation to each of said workholders while such workholders are at said cleaning station for causing the group of terminal elements of the article which is at said cleaning station to traverse said work zone, a pair of brush carriers swingably pivoted for closing and opening movement of said brushes relative to said work zone, brush spindle rotatable in said carriers for mounting said brushes thereon, bearing means adjacent said cleaning station, a pair of driven shafts rotatable in said bearing means and disposed substantially in axial alignment with said spindles, and a pair of adjacent substantially coextending flexible shafts connecting said spindles with said driven shafts.

2. In an insulation removing machine for operation on electrical articles of the kind having a group of insulation-covered terminal elements projecting therefrom and lying substantially in the same plane, a table, means supporting said table for rotary movement, a plurality of workholders adapted to receive individual articles and to support said articles with the groups of terminal elements of all of the articles lying substantially in a common plane, a cleaning station adjacent said table, means mounting said workholders for rotation on said table and for advance movement by the table to said cleaning station in succession, rotatable brushes at said cleaning station and disposed in paired relation so as to define a work zone therebetween and for operating against said terminal elements from opposite sides of said common plane, means operable to impart rotation to each of said workholders while said workholders are at said cleaning station for causing the group of terminal elements of the article which is at said cleaning station to traverse said work zone, a pair of brush carriers swingably pivoted for closing and opening movement of said brushes relative to said work zone, brush spindles rotatable in said carriers for mounting brushes thereon, bearing means adjacent said cleaning station, a pair of driven shafts rotatable in said bearing means and disposed substantially in axial alignment with said spindles, a pair of adjacent substantially coextending flexible shafts connecting said spindles with said driven shafts, and spring means effective on said carriers for urging said brushes toward their closed position.

3. In an insulation removing machine for operation on electrical articles of the kind having a group of insulation-covered terminal elements projecting therefrom and lying substantially in the same plane, a table, means supporting said table for rotary movement, a plurality of workholders adapted to receive individual articles and to support said articles with the groups of terminal elements of all of the articles lying substantially in a common plane, a pair of first and second cleaning stations adjacent said table, means mounting said workholders for rotation on said table and for advance movement by the table to said cleaning stations in succession, burner members at said first cleaning station and disposed in paired relation so as to define a work zone therebetween and for directing insulation burning medium against said terminal elements from opposite sides of said common plane, rotatable brushes at said second cleaning station and disposed in paired relation so as to define a work zone therebetween and for operating against said terminal elements from opposite sides of said common plane, and means operable to impart rotation to each of said workholders while such workholders are at said cleaning stations for causing the groups of terminal elements of the articles which are at said cleaning station to traverse said work zones.

4. In an insulation removing machine for operation on electrical armatures of the kind having an axial shaft and an annular group of insulation-covered bendable terminal elements projecting substantially radially therefrom and all lying substantially in the same plane, a table, means supporting said table for rotary movement about a table axis extending substantially normal to the plane of said table, a plurality of rotatable workholders adapted to receive individual armatures and to support said armatures with the shaft axes thereof substantially coincident with the rotation axes of the workholders and with the groups of terminal elements of all of the armatures lying substantially in a common plane spaced from said table and extending substantially normal to said table axis, a cleaning station adjacent said table, means mounting said workholders for rotation on said table and for advance movement in a substantially circular orbit by the table to said cleaning station in succession, a pair of cooperating brushes at said cleaning station and disposed adjacent to but laterally offset from the orbit of travel of said workholders, said brushes being in directly opposed relation to each other and rotatable about substantially parallel axes extending in a direction transverse to the rotation axes of the workholders and defining therebetween a work zone lying substantially in said common plane for operation of said brushes against said terminal elements from opposite sides of said common plane, a pair of brush carriers swingably pivoted for closing and opening movement of said brushes relative to said work zone, brush spindles rotatable in said carriers for mounting said brushes thereon, bearing means adjacent said cleaning station, a pair of driven shafts rotatable in said bearing means and disposed substantially in axial alignment with said spindles, a pair of adjacent substantially coextending flexible shafts connecting said spindles with said driven shafts, and spring means effective on said carriers for urging said brushes toward their closed position.

5. In an insulation removing machine for operation of electric armatures of the kind having a group of insulation-covered terminal wires lying in substantially the same plane and projecting substantially radially outwardly relative to the armature axis, a table, means supporting said table for rotary movement, a plurality of workholders having pockets therein adapted to receive individual armatures and to support said armatures with their axes in substantially coincident relation with the axes of the workholders and with the groups of terminal wires of all of the armatures lying in a common plane, means for imparting rotary movement to said table, a pair of first and second cleaning stations adjacent said table and to which said workholders are advanced in succession by the rotary movement of said table, burner members at said first cleaning station and disposed in paired relation so as to define a work zone therebetween and for directing insulation burning medium against said terminal elements from opposite sides of said common plane, rotatable brushes at said second cleaning station and disposed in paired relation so as to define a work zone therebetween and for operating against said terminal elements from opposite sides of said common plane, and means operable to impart rotation to each of said workholders while such workholders are at said cleaning stations for causing the groups of terminal elements of the armatures which are at said cleaning stations to traverse said work zones.

6. In an insulation removing machine for operation on electric armatures of the kind having a group of insulation-covered terminal wires lying in substantially the same plane and projecting substantially radially outwardly relative to the armature axis, a table, means supporting said table for rotary movement, a plurality of workholders having pockets therein adapted to receive individual armatures and to support said armatures with their axes in substantially coincident relation with the axes of the workholders and with the groups of terminal wires of all of the armatures lying in a common plane, means for imparting rotary movement to said table, a pair of first and second cleaning stations adjacent said table and to which said workholders are advanced in succession by the rotary movement of said table, burner members at said first cleaning station and disposed in paired relation so as to define a work zone therebetween and for directing insulation burning medium against said terminal elements from opposite sides of said common plane, rotatable brushes at said second cleaning station and disposed in paired relation so as to define a work zone therebetween and for operating against said terminal elements from opposite sides of said common plane, means effective to temporarily hold said table against rotary movement while one pair of said workholders are at said cleaning stations and to periodically release the table for advancing another pair of said workholders to said cleaning stations, and means for rotating said one pair of workholders and the armatures therein about the workholder axes while said one pair of workholders are at said cleaning stations to cause the group of terminal wires of the armatures of said one pair of workholders to travel through said work zones.

7. In an insulation removing machine, a table having a plurality of workholders rotatably mounted thereon and adapted to receive articles of the kind having a group of insulation-covered terminal elements projecting therefrom and lying in substantially the same plane, a plurality of work stations spaced around said table including a burning station and a brushing station, means mounting said table for floating rotary movement for advancing said workholders to said burning and brushing stations in succession, gas burner means at said burning station and comprising burner members adapted to direct burning medium against a group of said terminal elements from opposite sides of said plane, cooperating rotary brushes at said brushing station and adapted to provide a brushing zone for applying a brushing action to a group of said terminal elements from opposite sides of said plane, means for driving said brushes, a substantially continuously driven main gear, pinion gears meshing with said main gear and connected with said workholders for rotating the latter while said workholders are at said burning and brushing stations, said table being rotatable on said mounting means in response to the drag of said pinion gears on said main gear, latch means adapted to intermittently stop the rotary movement of said table while workholders are at said burning and brushing stations, and means for periodically actuating said latch means for releasing the table.

8. Apparatus as defined in claim 7 in which a cam member operated substantially continuously by said main gear periodically actuates said latch means for releasing the table.

9. In an insulation removing machine for operation on electric armatures of the kind having a group of insulation-covered terminal wires lying in substantially the same plane and projecting substantially radially outwardly relative to the armature axis, a table, a plurality of workholders spaced arcuately of said table and having pockets therein adapted to receive individual armatures and to support said armatures with their axes in substantially coincident relation with the axes of the workholders and with the groups of terminal wires of all of the armatures lying in a common plane, a plurality of cleaning stations adjacent said table comprising a burning station and a brushing station, a pair of burners at said burning station and disposed so as to define therebetween a burning zone and to direct burning medium against opposite sides of terminal wires traversing said burning zone, a pair of cooperating rotary brushes defining therebetween a brushing zone and effective to remove burned insulation residue from terminal wires traversing said brushing zone, means mounting said table for floating rotary movement for advancing said workholders to said burning and brushing stations in succession, a driven main gear, pinion gears meshing with said main gear and connected with said workholders for rotating the latter and the armatures carried thereby about the axes of the workholders, said table being rotatable on said mounting means in response to the drag of said pinion gears on said main gear, and means adapted to temporarily hold said table against rotary movement while one pair of said workholders are at said burning and brushing stations, said main gear and the pinion gears of said one pair of workholders being effective for rotating said one pair of workholders and the armature therein about the workholder axes while said one pair of workholders are at said burning and brushing stations to cause the groups of terminal wires of the armatures of said one pair of workholders to travel through said burning and brushing zones.

10. In an insulation removing machine for operation on electric armatures of the kind having a group of insulation-covered terminal wires lying in substantially the same plane and projecting substantially radially outwardly relative to the armature axis, a table, a plurality of workholders spaced arcuately of said table and having pockets therein adapted to receive individual armatures and to support said armatures with their axes in substantially coincident relation with the axes of the workholders and with the groups of terminal wires of all of the armatures lying in a common plane, a plurality of cleaning stations adjacent said table comprising a burning station and a brushing station, a pair of burners at said burning station and disposed so as to define therebetween a burning zone and to direct burning medium against opposite sides of terminal wires traversing said burning zone, a pair of cooperating rotary brushes defining therebetween a brushing zone and effective to remove burned insulation residue from terminal wires traversing said brushing zone, means mounting said table for floating rotary movement for advancing said workholders to said burning and brushing stations in succession, a driven main gear, pinion gears meshing with said main gear and connected with said workholders for rotating the latter and the armatures carried thereby about the axes of the workholders, said table being rotatable on said mounting means in response to the drag of said pinion gears on said main gear, latch means adapted to stop the rotary movement of said table while one pair of said workholders is at said burning and brushing stations, and means for periodically actuating said latch means for releasing the table, said gearing being effective for rotating said one pair of workholders and the armatures therein about the workholder axes while said one pair of workholders is at said burning and brushing stations to cause the groups of terminal wires of the armatures of said one pair of workholders to travel through said burning and brushing zones.

JOHN B. LEECE.

References Cited in the file of this patent

UNITED STATES PATENTS

| Number | Name | Date |
|---|---|---|
| 162,390 | Joyce | Apr. 20, 1875 |
| 892,129 | Broderick | June 30, 1908 |
| 935,503 | Heterington | Sept. 28, 1909 |
| 1,045,943 | Burrows | Dec. 3, 1912 |
| 1,136,110 | Eberhart | Apr. 20, 1915 |
| 1,220,552 | Provandie | Mar. 27, 1917 |
| 1,267,634 | Cooper | May 28, 1918 |
| 1,393,668 | Cummings | Oct. 11, 1921 |
| 1,532,717 | Schiller | Apr. 7, 1925 |
| 1,603,249 | Stevens | Oct. 12, 1926 |
| 1,886,699 | Larson | Nov. 8, 1932 |
| 1,914,879 | Bennett | June 20, 1933 |
| 2,116,228 | Akin | May 3, 1938 |
| 2,177,898 | Leguillon et al. | Oct. 31, 1939 |
| 2,182,799 | Farr | Dec. 12, 1939 |
| 2,242,801 | Richardson | May 20, 1941 |
| 2,264,496 | Wollentin | Dec. 2, 1941 |
| 2,307,046 | Johnson | Jan. 5, 1943 |
| 2,365,259 | Fischer | Dec. 19, 1944 |
| 2,401,930 | Hansen | June 11, 1946 |
| 2,440,377 | Myers | Apr. 27, 1948 |